(12) United States Patent  
Hasler et al.

(10) Patent No.: US 11,827,456 B2  
(45) Date of Patent: Nov. 28, 2023

(54) HYDRAULIC DRIVE MOTOR CONTROL SYSTEM

(71) Applicant: SANDVIK MINING AND CONSTRUCTION G.M.B.H., Zeltweg (AT)

(72) Inventors: Stefan Hasler, WeiBkirchen (AT); Christian Umundum, Spielberg (AT)

(73) Assignee: Sandvik Mining and Construction G.m.b.H., Zeltweg (AT)

( * ) Notice: Subject to any disclaimer, the term of this patent is extended or adjusted under 35 U.S.C. 154(b) by 455 days.

(21) Appl. No.: 17/258,017

(22) PCT Filed: Jul. 6, 2018

(86) PCT No.: PCT/EP2018/068336  
§ 371 (c)(1),  
(2) Date: Jan. 5, 2021

(87) PCT Pub. No.: WO2020/007480  
PCT Pub. Date: Jan. 9, 2020

(65) Prior Publication Data  
US 2021/0229924 A1    Jul. 29, 2021

(51) Int. Cl.  
*B65G 23/36*    (2006.01)  
*B65G 15/08*    (2006.01)  
*F15B 11/024*    (2006.01)

(52) U.S. Cl.  
CPC ............. *B65G 23/36* (2013.01); *B65G 15/08* (2013.01); *F15B 11/024* (2013.01); *F15B 2211/20576* (2013.01); *F15B 2211/6306* (2013.01); *F15B 2211/6653* (2013.01); *F15B 2211/7058* (2013.01); *F15B 2211/7142* (2013.01); *F15B 2211/75* (2013.01); *F15B 2211/76* (2013.01)

(58) Field of Classification Search  
None  
See application file for complete search history.

(56) References Cited

U.S. PATENT DOCUMENTS

| | | | |
|---|---|---|---|
| 4,032,003 A | 6/1977 | Hull | |
| 4,337,611 A * | 7/1982 | Mailander | A01D 41/1274 56/DIG. 15 |
| 4,765,456 A | 8/1988 | Bower | |
| 4,967,557 A * | 11/1990 | Izumi | E02F 9/2228 60/449 |
| 10,571,020 B2 * | 2/2020 | Witte | F16H 61/431 |
| 11,142,889 B2 * | 10/2021 | Ohigashi | E02F 9/2296 |

FOREIGN PATENT DOCUMENTS

| | | |
|---|---|---|
| JP | 2008168992 A | 7/2008 |
| WO | 2016131470 A1 | 8/2016 |

* cited by examiner

*Primary Examiner* — Kavel Singh  
(74) *Attorney, Agent, or Firm* — Corinne R. Gorski

(57) ABSTRACT

A hydraulic system is arranged to control a plurality of drive motors suitable for driving conveying apparatus such as a conveyor belt. The hydraulic system includes a modular master and slave hydraulic units implemented as hydraulic circuits in which pressure sensors and pressure reducing valves provide speed, torque and directional control.

15 Claims, 5 Drawing Sheets

HYDRAULIC DRIVE MOTOR CONTROL SYSTEM

RELATED APPLICATION DATA

This application is a § 371 National Stage Application of PCT International Application No. PCT/EP2018/068336 filed Jul. 6, 2018.

FIELD OF INVENTION

The present invention relates to a hydraulic control system to control a plurality of drive motors and in particular, although not exclusively, to a hydraulic system for driving a bulk material haulage arrangement encompassing a belt conveyor.

BACKGROUND ART

Within mining and bulk material processing, it is typically required to transport fragmented material from an extraction or partially processed location, such as a mining shaft underground, to a disposal location above ground for stock piling, onward transport or further processing. Typically, the fragmented material is transported by one or more conveying devices including belt conveyors, mobile haulage arrangements and especially continuous belt conveyors and closed loop conveyors (also referred to as pouch conveyors). Drive of the conveyor belts is typically provided by one or more drive arrangements in which a series of pulleys are driven by drive motors that are required to deliver the required driving characteristics including speed and force. Such drive arrangements are typically configured to try and minimise risks of damage to the belt by over tension whilst providing sufficient tension to avoid a slack belt and in turn tracking and stability problems.

WO 2016/131470 describes a drive arrangement for a belt and mobile haulage arrangement in which drive units provide drive of the conveyor belt in forward and reverse directions. A main drive unit is operated via torque setting dependent on the desired conveyor belt velocity and at least one auxiliary drive unit is operated with a pre-set torque.

U.S. Pat. No. 4,765,456 discloses a variable speed belt conveyor drive system programmable to suit different operating conditions having a master drive unit with a drive motor and at least one slave unit with a respective drive motor. A control unit, control loop and a multiplexer are operated to control the motors to share the load at a pre-programmed level for desired speed of operation within both the master drive and slave drive assemblies.

U.S. Pat. No. 4,032,003 discloses a hydrostatic conveyor drive assembly employing a constant speed master drive and a slave drive of a hydrostatic, closed loop type. No electrical of hydraulic feedback lines between the master and slave drive unit are provided. As such, the master unit drives the conveyor at a constant speed (according to variable loads) and the slave drive unit responds to changes in load on the conveyor to vary the speed of the drive and to maintain a constant pull on the conveyor.

However, existing control and drive systems are limited with regard to the range of speed and force adjustment during use. Additionally, such systems typically include a relatively large number of control parameters. Accordingly, what is required is a drive arrangement that provides advantages over existing systems.

SUMMARY OF THE INVENTION

It is an objective of the present invention to provide a modular drive control system suitable for the driven control of bulk material haulage apparatus such as conveyor belt arrangements that provides a high level of adjustment of speed and force at a plurality of different drive locations along the haulage arrangement.

It is a further objective to provide a drive system having a minimised number of control parameters to provide a simplified control arrangement. It is a further objective to provide a system that minimises the number of component parts and in particular control supply lines such as hydraulic fluid hosing, couplings etc.

It is a further specific objective to provide a control system for convenient modularity with regard to the number of drive units per system or machine whilst driving a conveyor belt arrangement with directional speed and/or torque control.

The objectives are achieved via a hydraulic system providing control of a plurality of drive motors in which a master unit may be speed controlled via hydraulic fluid flow regulation and one or more slave units may be controlled directly or indirectly by the master unit. Preferably, the master unit and slave unit(s) are capable of controlling the speed, torque and/or direction (forward and reverse) of their respective drive motors that in turn provides drive of suitable pulleys acting on the belt at a plurality of different positions.

The present system is advantageous to provide a completely modular hydraulic interconnected network of open hydraulic control circuits. The collective system circuit may be divided into a hydraulic master unit circuit and a plurality of hydraulic slave unit circuits that are respectively interconnected via electronic or electrical connection. Accordingly, the present arrangement is beneficial in that the slave unit(s) may be located remote from the master unit (for example at a separation distance of up to 50 m or more) without the need for intermediate hydraulic hosing that would otherwise provide the necessary control and feedback. The present system, whilst utilising hydraulic circuits, employs electronic or electrical connection between the hydraulic circuits that may be implemented via wired or wireless communication to achieve the desired master and slave functionality. In particular, and preferably the master hydraulic unit comprises a master control arrangement to control hydraulic fluid flow and hence speed of a set of master motors. A pressure transducer at the master unit is coupled electronically or electrically with a pressure reducing valve arrangement provided at each slave hydraulic unit that in turn provides appropriate torque control of the respective slave drive motors. Accordingly, the present system ensures the slave drive motors are actuated at a pressure below the corresponding motors at the master unit to ensure that each of the slave units do not become the master.

Advantageously, the present system and in particular the master hydraulic unit further comprises a set of primary master slave motors that are controllable indirectly by the master control valve assembly via a pilot valve assembly positioned in the fluid flow path between the control valve assembly and the master motor. A pilot operated primary pressure reducing valve assembly is supplied by the pilot valve assembly for drive of the primary slave motors at reduced pressure relative to the master motor. Preferably, the pressure transducer at the master unit (for electronic or electrical pilot control of the pressure reducing valve arrangement at the slave units) is positioned at the pilot operated pressure reducing valve arrangement that controls the primary slave motors. Such an arrangement is advantageous to ensure the slave hydraulic units are pre-set under torque control according to the operating condition of the primary slave motors.

The present system is advantageously constructed as an electrically or electronically interconnected open hydraulic fluid network in which a pump at each of the master and slave units drives the flow of hydraulic fluid within each of the respective open circuits having respective fluid drains and/or reservoirs. The open hydraulic circuit arrangement minimises component parts and the overall complexity of the system for convenient installation and reliable operation with minimised maintenance.

According to a first aspect of the present invention there is provided a hydraulic system to control a plurality of drive motors, the system comprising: i) a master unit hydraulic circuit comprising: a master pump; a master control valve assembly having an inlet fluidly connected to the pump and a first outlet fluidly connected to a drain or reservoir; at least one master motor fluidly connected to a second outlet of the master control valve assembly; a pilot valve assembly fluidly connected in a fluid flow direction between the master control valve assembly and the master motor and having a pilot line; a primary slave valve assembly fluidly connected to the pilot line and having an inlet fluidly connected to the pump, a first outlet fluidly connected to the drain or reservoir and a second outlet; at least one primary slave motor fluidly connected to the second outlet of the primary slave valve assembly; a pilot operated primary pressure reducing valve fluidly connected to or forming part of the primary slave valve assembly and acted on by the pilot valve assembly via the pilot line to reduce the pressure at the primary slave motor below the pressure of the master motor; and a master pressure sensor to measure a pressure at the primary slave valve assembly and/or the primary slave motor; ii) at least one slave unit hydraulic circuit comprising: a slave pump; a pressure regulation valve assembly comprising at least one electrically or electronically controlled secondary pressure reducing valve; a secondary slave valve assembly having an inlet fluidly connected to the slave pump via the pressure regulation valve assembly, a first outlet fluidly connected to a drain or reservoir and a second outlet; and at least one secondary slave motor fluidly connected to the second outlet of the secondary slave valve assembly; iii) the pressure regulation valve assembly connected electrically or electronically to the master pressure sensor to provide operational control of the pressure at the secondary slave motor.

Preferably, the master circuit further comprises a directional control valve assembly fluidly connected in the fluid flow path between the master pump and the primary slave valve assembly to provide pilot control of at least a part of the primary slave valve assembly.

Preferably, the directional control valve of the primary slave valve assembly may be hydraulically pilot controlled by the directional control valve assembly that may comprise on/off solenoid valves. The directional control valve may comprise a proportional hydraulic piloted valve.

Optionally, the primary and secondary slave valve assemblies respectively comprise bi-directional flow valves, optionally arranged in pairs with each pair coupled respectively to a respective inlet and outlet side of each of the primary and secondary slave motor.

Optionally, the master circuit may further comprise a load feed-back valve assembly connected in the flow pathway between the pump and each of the master control valve assembly and the primary slave valve assembly for load feed-back control of the pump.

Optionally, the master circuit may further comprise an integrated pressure relief valve assembly positioned immediately upstream in a fluid flow direction from the pump i.e. between the pump and each of the master control valve assembly and the primary slave valve assembly.

Preferably, the master control valve assembly and/or the pilot valve assembly comprise at least one directional control valve to control an operational direction of the master motor. The directional control valve is preferably a bi-directional control valve. Preferably each motor comprises a pair of bi-directional control valves.

Optionally, the master pressure sensor is positioned in the fluid flow path between the pilot operated pressure reducing valve and the primary slave valve assembly. The master pressure sensor may be positioned at the inlet side of the pilot operated pressure reducing valve and/or the primary slave valve assembly. Optionally, the master pressure sensor may be integrated within the primary slave valve assembly at a position in the fluid flow direction between the pressure reducing valve and the primary slave motor. This provides that the operating pressure of the primary slave motor is determined accurately and reliably for subsequent electronic or electrical pilot control of the pressure reducing valve within each slave unit hydraulic circuit.

Preferably, the secondary pressure reducing valve is wired or wirelessly connected to the master pressure sensor. Wired connection may be provided by conventional electrical connection extending between the master unit and each of the slave units. Optionally, the connection may be wireless in which the master and slave units comprise wireless communication components including for example radio frequency (RF) communication modules, Bluetooth components, Wi-Fi components or other conventional wireless communication means.

Optionally, the secondary pressure reducing valve is controlled exclusively by the master pressure sensor. Such an arrangement is advantageous to minimise the number of control parameters within the system as the slave units are controlled exclusively by the master unit. Accordingly, the respective pumps within the slave units may be operated according to a pre-set operating condition without the need for dynamic control.

Preferably, the slave unit hydraulic circuit further comprises a directional control valve assembly fluidly connected in the fluid flow path between the slave pump and the secondary slave valve assembly to provide pilot control of at least a part of the secondary slave valve assembly. Preferably, the secondary slave valve assembly further comprises at least one directional control valve pilot controlled by the directional control valve assembly to control an operational direction of the secondary slave motor. The directional control valve assembly of the slave unit hydraulic circuit may comprise on/off solenoid valves and the directional control valve of the secondary slave valve assembly may comprise a proportional hydraulic piloted valve.

Optionally, the slave drive hydraulic circuit further comprises a slave pressure sensor to measure a pressure at the slave valve assembly and/or the secondary slave motor. Optionally, the slave pressure sensor may be positioned at an inlet side of the secondary slave valve assembly or integrated into the assembly to determine accurately and reliably the pressure at the respective secondary slave motor.

Optionally, the pilot valve assembly, the primary slave valve assembly and/or the secondary slave valve assembly further comprise at least one directional valve, at least one shuttle valve and/or at least one counterbalance valve in the fluid flow pathway to the respective motors.

Optionally, the hydraulic system comprises a single master unit hydraulic circuit and a plurality of slave unit hydraulic circuits as claimed herein wherein each slave unit hydraulic circuit is connected electrically or electronically and directly or indirectly to the master pressure sensor. Optionally, each of the slave unit hydraulic circuits may be coupled directly to the master unit hydraulic circuit with the connection provided between the master pressure sensor and each of the respective pressure reducing valves within the slave circuits. Optionally, the slave circuits may be relayed in-series where the slave units further comprise respective slave pressure sensors optionally positioned respectively at the secondary slave valve assembly. In such embodiments, the pressure reducing valve within a first slave unit hydraulic circuit may be controlled by the slave pressure sensor within a preceding second slave unit hydraulic circuit according to a relay configuration with the collective slave circuits ultimately controlled by the master pressure sensor.

Preferably, the system comprises at least one or a plurality of sensors that may include in particular fluid flow sensors providing monitoring, output and response control of fluid pressure and flow speed (flow rate) within the system and optionally fluid pressure sensors. Optionally, the sensors may be positioned at the valves, the conduits and/or the hydraulic actuators.

Preferably, the hydraulic system further comprises at least microprocessor provided in communication between the master pressure sensor and the pressure reducing valve, wherein the microcontroller is configured to control the pressure reducing valve for pressure adjustment/regulation at the slave unit hydraulic circuit to provide operational control of the pressure at the secondary slave motor. Preferably, the master-slave control and communication (between the master and slave units) is implemented via electrical/electronic coupling between master pressure sensor and the microcontroller which in turn is coupled to the pressure reducing valve for pressure adjustment/regulation at each slave unit. The system may comprise a single microprocessor or plurality of microprocessors in which a microprocessor is provided respectively at each slave unit for independent pressure regulation/control as set by the master unit.

Preferably, the system comprises a plurality of primary slave motors and a plurality of secondary slave motors.

Optionally, the various control valves referred to herein may comprises electrohydraulic valves that are electrically controlled independently of one another or collectively as part of a block. Optionally, the electronically controllable valves may include electrohydraulic valves and/or solenoid control valves. Such valves are utilised to control fluid flow volume and/or speed within the system. Such control valves may be coupled with via wired or wireless communication with an external control such as a computer, a network, a remote computer, processor based utility or server. Optionally, the electrohydraulic valves may comprise any one or a combination of proportional solenoid valves, directional control values or servo valves. Within this specification, reference to electrohydraulic valves encompasses valve types configured to control flow direction, flow volume and fluid pressure via electrical signal control of moving components (i.e., spools) within the valves. Such valves may be operated using AC or DC power.

According to a second aspect of the present invention there is provided a conveyor apparatus to convey bulk material between locations in at least one conveying direction, the apparatus comprising: a conveyor belt; at least one master drive pulley and a plurality of slave drive pulleys for driving the belt in the at least one conveying direction; and a hydraulic system as claimed herein in which the master motor is driveably coupled to the master drive pulley and the primary and secondary slave motors are driveably coupled to respective slave drive pulleys to provide drive of the respective drive pulleys and the conveyor belt. Optionally, the conveyor apparatus comprises at least one master drive unit coupled to the master unit hydraulic circuit and a plurality of slave drive units coupled to respective slave unit hydraulic circuits; wherein the slave drive units are positionally separated from the master drive unit to provide drive of the conveyor belt at different locations of the conveyor apparatus.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 1:
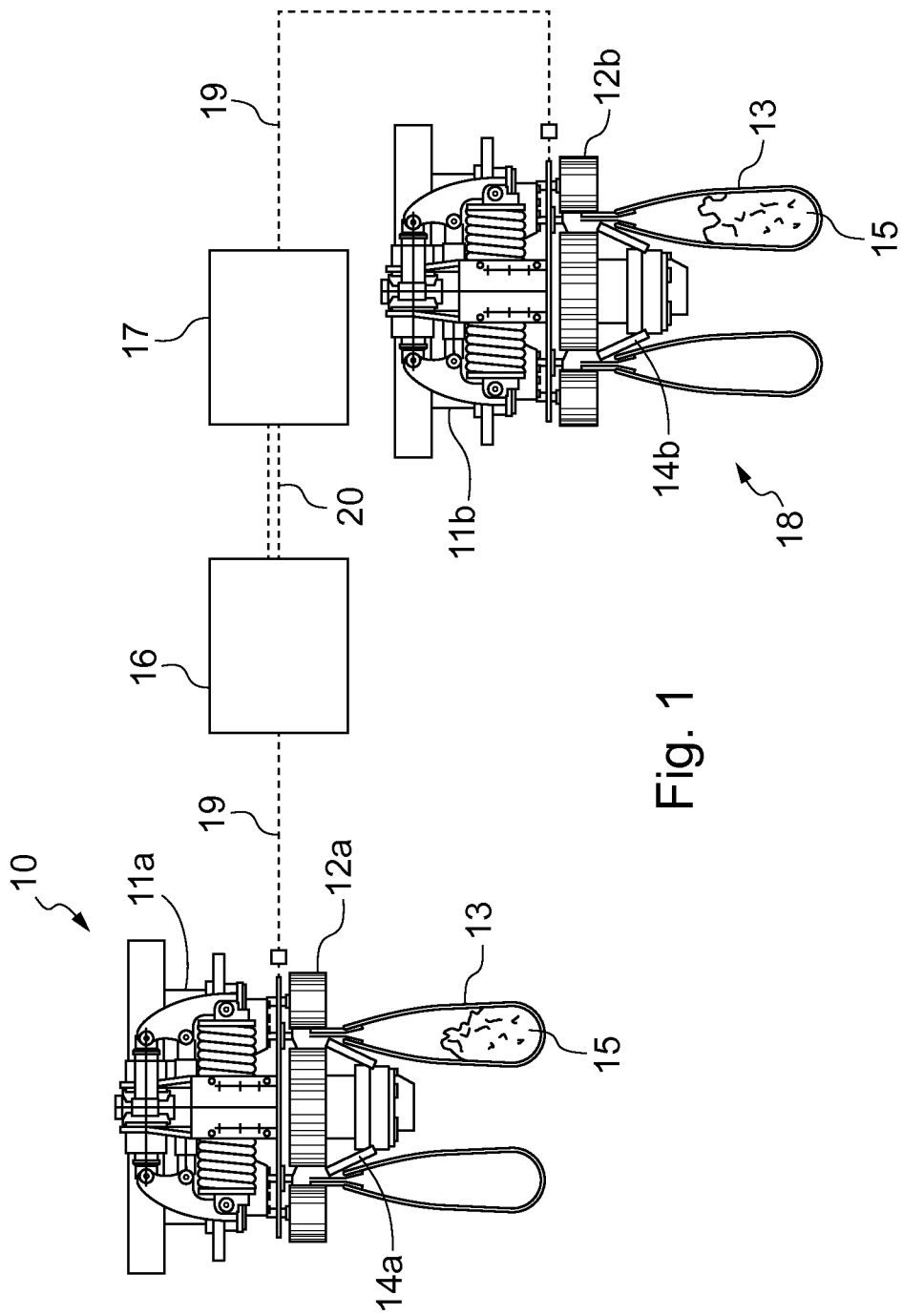
FIG. 1 is a schematic illustration of a master drive unit coupled to a slave drive unit for driving control of a pouch-type conveyor via a master and slave hydraulic control system.

Referring to FIG. 1, a modular hydraulically implemented conveyor belt system is provided including specifically a hydraulic drive motor control arrangement. The hydraulic drive arrangement provides a fully modular system to drive a continuous haulage arrangement in which hydraulic master and slave units are coupled via electrical or electronic communication means. The present system advantageously minimises control parameters whilst providing selective adjustment of belt drive including in particular directional speed and force control optionally via a single parameter input at the master unit. The present system is advantageous to obviate the requirement for extensive lengths of hydraulic fluid hoses, junctions and connections via the electrical/electronic coupling of the master and slave units.

Referring to FIG. 1, a master drive unit 10 comprises a master drive arrangement 11a having a plurality of drive pulleys 12a and belt stabilisation pulleys 14a. A pouch-type conveyor belt 13 is suspended below arrangement 11a for the bi-directional transport of bulk material 15. A corresponding secondary, slave belt drive unit 18 comprises a slave drive arrangement 11b also coupled to belt 13 at a remote location relative to master drive unit 10 and for example separated by a distance of 10, 20, 30, 40, 50 or more meters. Slave arrangement 11b further comprises a corresponding plurality of drive pulleys 12b and belt stabilisation pulleys 14b.

Conveyor drive unit 10 is driven by a master hydraulic circuit 16 (coupled to drive pulley 12a via a hydraulic network 19) that includes a plurality of corresponding hydraulic drive motors that, in turn, are coupled respectively to the drive pulleys 12a. A corresponding hydraulic slave circuit 17 provides translated drive of the slave conveyor drive unit 18 (via a respective hydraulic network 19) with the corresponding drive of slave pulleys 12b achieved via respective hydraulic drive motors. The hydraulic slave circuit 17 is controlled directly by master circuit 16 via electrical/electronic communication means indicated schematically by reference 20.

Figure 2:
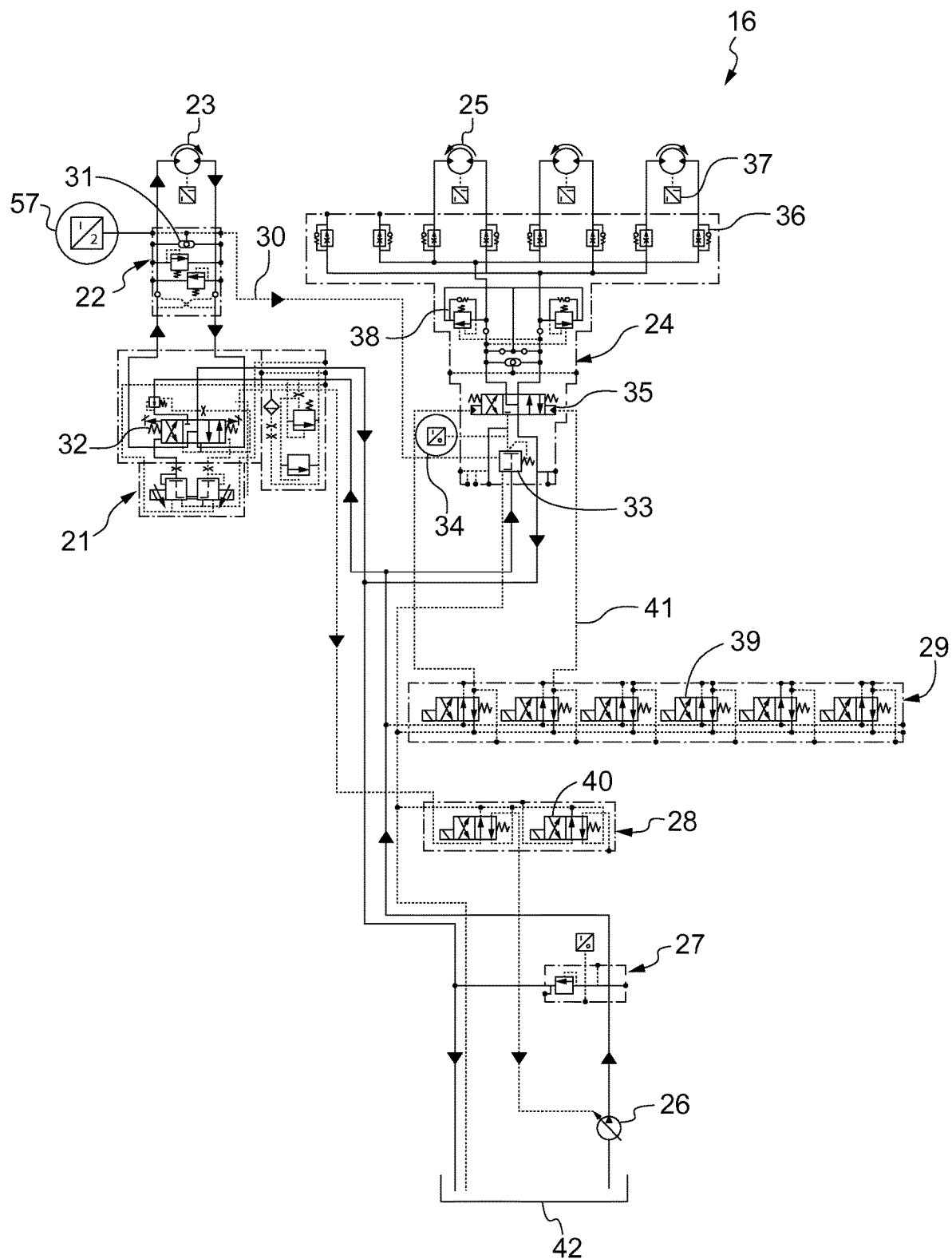
FIG. 2 is a hydraulic circuit diagram of a master control unit forming part of the control system of FIG. 1.

Referring to FIG. 2, master circuit 16 is implemented as an open hydraulic circuit that includes primarily: a master pump 26; a master control valve assembly 21; a pilot valve block 22; a primary slave valve assembly 24; a master motor 23; a plurality of primary slave motors 25; a pilot operated primary pressure reducing valve 33 and a master pressure sensor 34. Circuit 16 further comprises an integrated pressure relief valve block 27; a load feed-back valve block 28; a directional control valve block 29 and a reservoir 42.

Pump 26 provides hydraulic flow to circuit 16 and is coupled directly to integrated pressure relief valve block 27. Load feed-back valve block 28 is mounted in the fluid pathway immediately upstream of pump 26 to provide load feed-back control. Integrated pressure relief valve block 27 is, in turn, coupled in fluid communication with master control valve assembly 21 and primary slave valve assembly 24. Directional control valve block 29 is also fed by pump 26 (via integrated pressure relief valve block 27) at the inlet side and is coupled to the primary slave valve assembly 24 at an outlet side (via a pilot line 41).

Master control valve assembly 21 is coupled at a first outlet side to the pilot valve block 22 and a second outlet side to reservoir 42 and load feed-back valve block 28. Pilot valve block 22 is coupled at a first outlet side to master motor 23 and at a second outlet side to master control valve assembly 21. Pilot valve block 22 is further coupled via a pilot line 30 to primary slave valve assembly 24 so as to provide hydraulic pilot control of assembly 24. Master pressure sensor 34 (preferably implemented as a pressure transducer) is coupled at the inlet side of the primary slave assembly 24 so as to determine the hydraulic fluid pressure delivered to the primary slave motors 25 via assembly 24.

According to the specific implementation, the master control valve assembly may comprise any conventional hydraulic control unit as will be familiar to those skilled in the art including for example directional flow valves 32, counter balance valves, solenoid control valves, proportional solenoid valves etc. The pilot valve block 22 comprises a shuttle valve 31 to provide maximum operating pressure and an auxiliary pressure sensor 57 to determine the pressure at master motor 23. Primary slave assembly 24 comprises a directional valve 35 coupled to pilot operated pressure reducing valve 33 that is in turn controlled hydraulically via pilot line 30 and pilot valve block 22. Assembly 24 further comprises counter balance valves 38 and respective pairs of bi-directional flow valves 36 provided at the inlet and outlet sides of each respective primary slave motor 25. A set of auxiliary pressure transducers 37 are also coupled to each respective primary slave motor 25. According to the specific implementation, directional control valve block 29 and load feed-back valve block 28 comprise directional solenoid control valves 39, 40.

Figure 3:
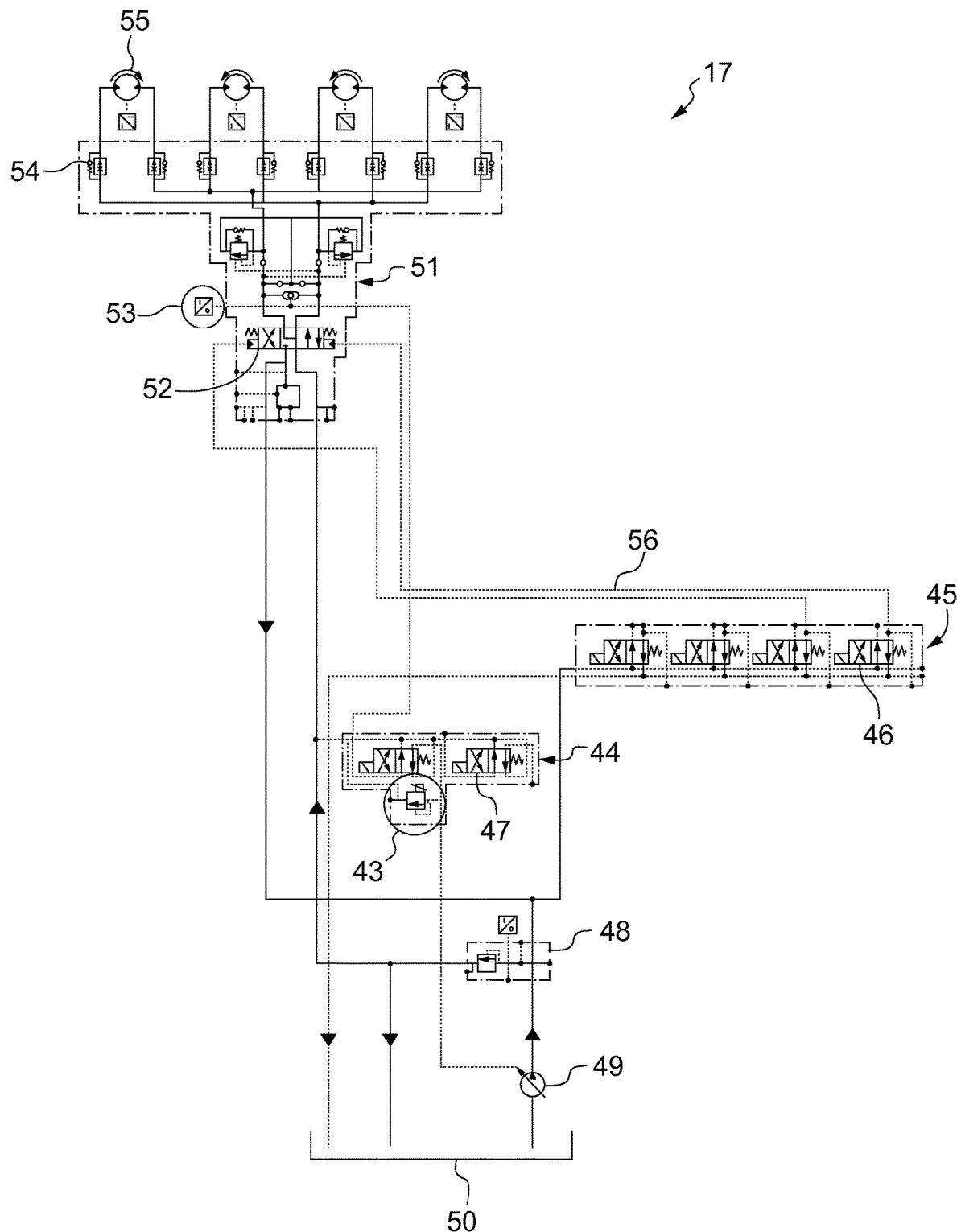
FIG. 3 is a hydraulic circuit diagram of a slave unit of the control system of FIG. 1.

Referring to FIG. 3, hydraulic slave circuit 17 comprises primarily: a pump 49; a pressure regulation valve assembly 44; a secondary slave valve assembly 51 (having a plurality of secondary slave motors 55); a pressure reducing valve 43 (provided at assembly 44) and a reservoir 50. Circuit 17 further comprises a directional control valve block 45; a secondary pressure sensor 53 and an integrated proportional pressure relief valve block 48.

As will be noted, and similar to the master circuit 16, pressure relief valve block 48 is coupled at an inlet side to pump 49 and at an outlet side to directional control valve block 45. A second outlet side of block 48 is coupled to secondary slave valve assembly 51 and pressure regulation valve assembly 44. Directional control valve block 45 provides hydraulic pilot control of a directional valve 52 within secondary slave assembly 51 via pilot line 56. An outlet side of secondary slave valve assembly 51 is coupled to reservoir 50 and load feed-back valve block 48. According to the specific implementation, directional control valve block 45 and pressure regulation valve assembly 44 comprise directional solenoid control valves 46, 47.

Figure 4A:
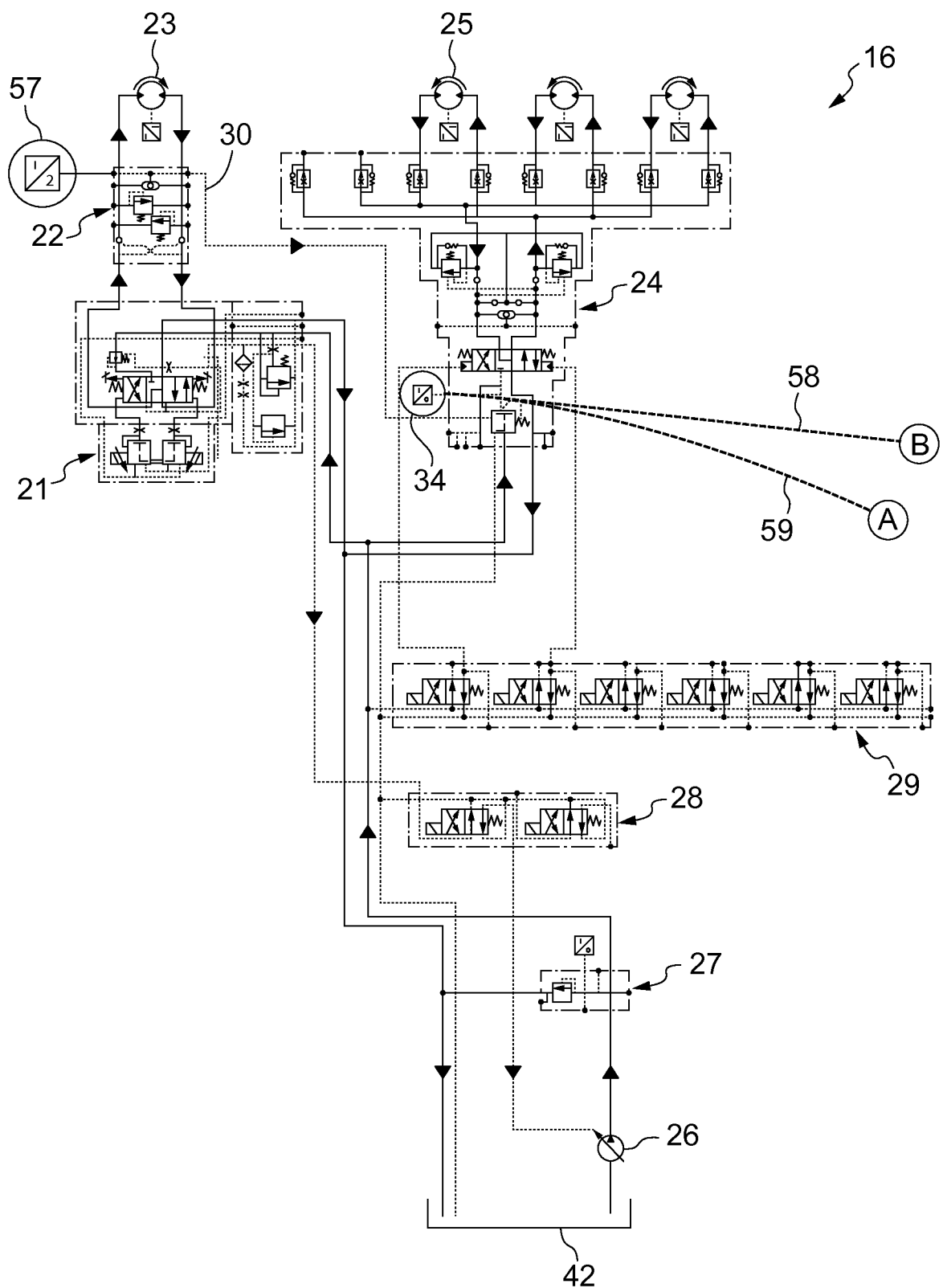
FIG. 4A is a hydraulic circuit of the master unit of FIG. 2 implemented for controlling the pouch conveyor drive units of FIG. 1.
Figure 4B:
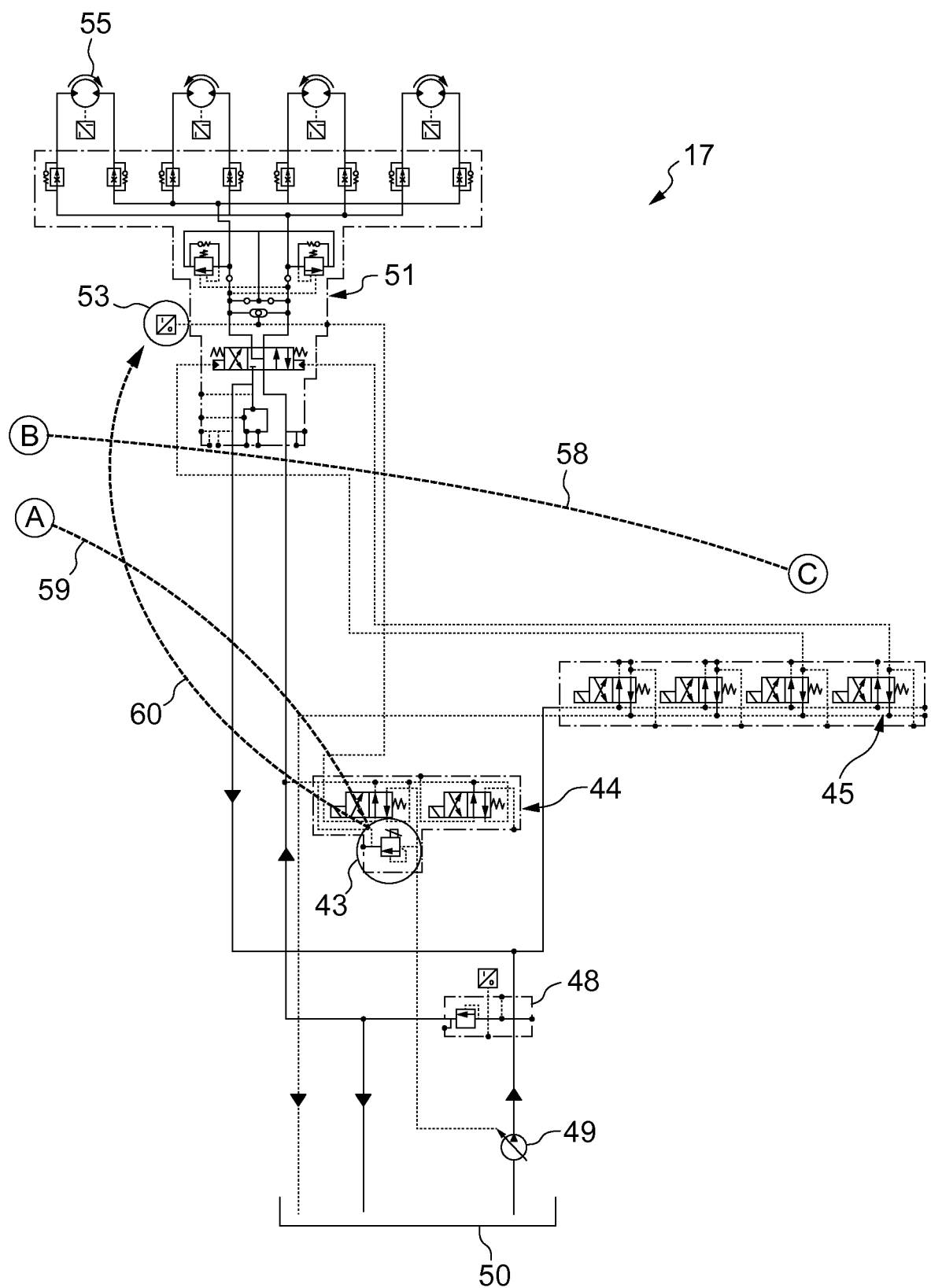
FIG. 4B is a hydraulic circuit of the slave unit of FIG. 3 implemented for controlling the pouch conveyor drive units of FIG. 1.

Referring to FIGS. 4A and 4B, slave circuit 17 and in particular secondary slave motors 55 are controlled directly by master circuit 16 via the indirect electrical/electronic coupling 59 between master pressure sensor 34 and pressure regulation valve assembly 44 that includes in particular the integrated proportional pressure reducing valve 43.

The system further comprises at least microprocessor that may be implemented and represented schematically by 'A' and/or 'B' of FIGS. 4A and 4B. That is, master-slave control and communication (between units 16 and 17) is implemented via electrical/electronic coupling between master pressure sensor 34 and the microcontroller A, B which in turn is coupled to pressure reducing valve 43 for pressure adjustment/regulation at each slave unit 17.

Accordingly, pilot operated primary pressure reducing valve 33 is important to set the pressure of the primary slave motors 25. This pressure is monitored by master pressure sensor 34 and then via the electrical/electronic communication between master pressure sensor 34 and microcontroller A, B (and hence valve 43) the pressure at the secondary slave motors 55 is controlled and importantly set by the master unit 16.

Sensor 53 within the slave unit 17 is also coupled to the microprocessor A, B and is important to check the pressure at secondary slave motors 55. If adjustment is needed to maintain the pressure below that of the master unit 16, this is done via microprocessor A, B controlling valve 43 appropriately with the microprocessor-regulated/adjusted pressure being confirmed by sensor 53.

Accordingly, hydraulic fluid supplied to the secondary slave valve assembly 51 is pilot controlled by master circuit 16 via microprocessor A, B, assembly 44, valve 43 and sensor 53. As will be appreciated, master circuit 16 may be coupled to further slave circuits 17 via corresponding electrical/electronic coupling 58 where reference 'C' corresponds to a further indirect coupling to an additional secondary slave valve assembly 44 (of a further slave circuit 17 having the electronic circuit and integrated components as illustrated and described referring to FIGS. 3 and 4B) via a respective or the same microprocessor (A, B). According to a further specific implementation, further slave circuits 17 may be controlled in-series via electrical/electronic coupling between the respective pressure reducing valve 43 of a first slave circuits 17 and a pressure sensor 53 of a preceding neighbouring second slave circuits 17.

As will be appreciated, master circuit 16 controls a speed of conveyor belt 13 via master motor 23. The pressure at primary slave assembly 24 controls the speed of primary slave motors 25 dependent on the master pressure. The pilot operated pressure reducing valve 33 reduces the pressure at the primary slave motors 25 to a pressure below the pressure at the master motor 23. Such a pressure reduction may be in the region of 0.1 to 2 MPa and may be 0.3 to 1.1 MPa. Such an arrangement prevents the primary slave motors 25 becoming the master motors 23 operationally. Circuit 16 is further advantageous to provide drive of both sets of motors 23, 25 by a single pump 26.

As will be appreciated, the single or plurality of slave circuits 17 are torque controlled via the electronic/electrical coupling 58, 59. Pressure sensor 34 measures the desired slave pressure at assembly 24 to set the proportional pressure reducing valve 43 at each respective slave circuit 17 according to the designated slave pressure. The required torque is accordingly divided to the circuit(s) 17. The present arrangement is advantageous to reduce the operational control parameters to a single control parameter for circuits 16 and 17. Preferably, master circuit 16 is implemented under speed control and slave circuits are implemented under torque control. Additionally, the present hydraulic control system encompassing circuits 16, 17 provides a modular arrangement that may be adapted to the requirements of different conveying machines and apparatus to suit different lengths and load requirements. Via the various directional control assemblies and valves, the present system provides both speed (variable volume) and torque (variable pressure) control in addition to directional control of the various drive motors 23, 25, 55.

The invention claimed is:

1. A hydraulic system arranged to control a plurality of drive motors, the system comprising:
    i) a master unit hydraulic circuit comprising:
        a master pump;
        a master control valve assembly having an inlet fluidly connected to the pump and a first outlet fluidly connected to a drain or reservoir;
        at least one master motor fluidly connected to a second outlet of the master control valve assembly;
        a pilot valve assembly fluidly connected in a fluid flow direction between the master control valve assembly and the master motor and having a pilot line;
        a primary slave valve assembly fluidly connected to the pilot line and having an inlet fluidly connected to the pump, a first outlet fluidly connected to the drain or reservoir and a second outlet;
        at least one primary slave motor fluidly connected to the second outlet of the primary slave valve assembly;
        a pilot operated primary pressure reducing valve fluidly connected to or forming part of the primary slave valve assembly and arranged to be acted on by the pilot valve assembly via the pilot line to reduce the pressure at the primary slave motor below the pressure of the master motor; and
        a master pressure sensor to measure a pressure at the primary slave valve assembly and/or the primary slave motor; and
    ii) at least one slave unit hydraulic circuit comprising:
        a slave pump;
        a pressure regulation valve assembly including at least one electrically or electronically controlled secondary pressure reducing valve;
        a secondary slave valve assembly having an inlet fluidly connected to the slave pump via the pressure regulation valve assembly, a first outlet fluidly connected to a drain or reservoir and a second outlet; and
        at least one secondary slave motor fluidly connected to the second outlet of the secondary slave valve assembly, the pressure regulation valve assembly being connected electrically or electronically to the master pressure sensor to provide operational control of the pressure at the secondary slave motor.

2. The hydraulic system as claimed in claim 1, wherein the master circuit further comprises a directional control valve assembly fluidly connected in the fluid flow path between the master pump and the primary slave valve assembly to provide pilot control of at least a part of the primary slave valve assembly.

3. The hydraulic system as claimed in claim 2, wherein the primary slave valve assembly includes a directional valve pilot controlled by the directional control valve assembly.

4. The hydraulic system as claimed in claim 1, wherein the master control valve assembly and/or the pilot valve assembly include at least one directional control valve to control an operational direction of the master motor.

5. The hydraulic system as claimed in claim 1, wherein the primary and secondary slave valve assemblies respectively include directional flow valves coupled respectively to each of the primary and secondary slave motors.

6. The hydraulic system as claimed in claim 1, wherein the master pressure sensor is positioned in the fluid flow path between the pilot operated pressure reducing valve and the primary slave valve assembly.

7. The hydraulic system as claimed in claim 1, wherein the secondary pressure reducing valve is wired or wirelessly connected to the master pressure sensor.

8. The hydraulic system as claimed in claim 1, wherein the secondary pressure reducing valve is controlled exclusively by the master pressure sensor.

9. The hydraulic system as claimed in claim 1, wherein the slave unit hydraulic circuit further comprises a directional control valve assembly fluidly connected in the fluid flow path between the slave pump and the secondary slave valve assembly to provide pilot control of at least a part of the secondary slave valve assembly.

10. The hydraulic system as claimed in claim 9, wherein the secondary slave valve assembly includes at least one directional control valve pilot controlled by the directional control valve assembly to control an operational direction of the secondary slave motor.

11. The hydraulic system as claimed in claim 1, wherein the slave unit hydraulic circuit further comprises a slave pressure sensor arranged to measure a pressure at the slave valve assembly and/or the secondary slave motor.

12. The hydraulic system as claimed in claim 1, further comprising at least one microprocessor provided in communication between the master pressure sensor and the pressure reducing valve, wherein the microcontroller is configured to control the pressure reducing valve for pressure adjustment/regulation at the slave unit hydraulic circuit to provide operational control of the pressure at the secondary slave motor.

13. The hydraulic system as claimed in claim 1, comprising a single master unit hydraulic circuit and a plurality of slave unit hydraulic circuits, wherein each slave unit hydraulic circuit is connected electrically or electronically and directly or indirectly to the master pressure sensor.

14. A conveyor apparatus arranged to convey bulk material between locations in at least one conveying direction, the apparatus comprising:
    a conveyor belt;
    at least one master drive pulley and a plurality of slave drive pulleys for driving the belt in the at least one conveying direction; and
    a hydraulic system as claimed in claim 1, wherein the master motor is driveably coupled to the master drive pulley and the primary and secondary slave motors are driveably coupled to respective slave drive pulleys to provide drive of the respective drive pulleys and the conveyor belt.

15. The conveyor apparatus as claimed in claim 14, comprising at least one master drive unit coupled to the master unit hydraulic circuit and a plurality of slave drive units coupled to respective slave unit hydraulic circuits, wherein the plurality of slave drive units are positionally separated from the master drive unit to drive of the conveyor belt at different locations of the conveyor apparatus.

\* \* \* \* \*